Oct. 16, 1962 K. W. EISSMANN ET AL 3,059,172

POTENTIAL DEVICE

Filed April 6, 1961

Inventors,
Kurt W. Eissmann,
Philip V. Shade,
by Gilbert P. Tarleton
Their Attorney.

United States Patent Office 3,059,172
Patented Oct. 16, 1962

3,059,172
POTENTIAL DEVICE
Kurt W. Eissmann, Dalton, and Philip V. Shade, Pittsfield, Mass., assignors to General Electric Company, a corporation of New York
Filed Apr. 6, 1961, Ser. No. 101,262
6 Claims. (Cl. 323—61)

This invention relates to potential devices and more in particular to a potential device including improved means for obtaining a resonant match between the reactance of the potential device and its high voltage source.

In high voltage electrical systems it is customary to employ potential devices for supplying a voltage proportional to that of the system to small loads such as electro-responsive relays or measuring instruments. In power transmission systems the input of the potential device is often obtained by tapping a condenser-type bushing in the manner of a capacitance potentiometer. In order to reduce losses to a minimum, the input reactance of the potential device and its load should be adjustable so that a resonant match can be obtained with the equivalent reactance of the capacitance potentiometer. Also the voltage output of the potential device should be adjustable so that its load can be supplied with voltage in a preferred range.

Numerous arrangements for accomplishing the above broad objectives have been employed by the prior art. However, these prior art arrangements have specific disadvantages in certain applications. For example, in United States Letters Patent No. 2,440,540 to J. W. Farr, assigned to the present assignee, the reactance of the transformer is adjusted by employing a large number of taps and switches. This results in an increased cost of the potential device and also limits its adjustment range according to the number of taps in the windings. In United States Letters Patent No. 2,930,964 to R. F. Goodman, also assigned to the present assignee, a transformer for potential devices is disclosed in which a constant reactance may be obtained when the output taps of the transformer are changed. This is achieved by employing split secondary windings that are loosely and closely coupled and also a tertiary winding; numerous taps are also utilized. This results in an increase in the cost of the device and a limitation in the range of reactance variations obtainable.

As electrical power transmission systems employ higher transmission voltages, the capacitive reactance of the high voltage bushings decreases. This necessitates a lowering of the inductive reactance of the potential devices to a range that enables a resonant match with the bushings when the bushings are employed as capacitance potentiometers. It has been found that the construction of prior art potential devices of the type described above imposes practical limitations that prevent economical lowering of the inductive reactance of the devices while maintaining a satisfactory range of output voltages.

Accordingly, it is an object of this invention to provide an improved transformer for potential devices having variable reactance and variable output voltages.

Another object of the invention is to provide an improved potential device transformer having a small number of windings on its core and a small number of taps in the windings.

Another object of the invention is to provide a transformer for potential devices having a reduced inductive reactance that is variable.

A further object of the invention is to provide a transformer for potential devices that has a simplified, economical construction.

A further object of the invention is to provide a potential device that employs relatively inexpensive low-voltage circuit elements.

Briefly stated, in accordance with one aspect of our invention, a potential device is provided with a transformer having a primary winding adapted to be connected to a capacitance potentiometer. The transformer has a coupling winding closely coupled to the primary winding, and a secondary winding loosely coupled to the primary winding. The coupling winding has a predetermined number of turns, and the secondary winding may have a tap that provides substantially the same number of turns as the coupling winding. The potential device is provided with means for varying its reactance to obtain a resonant match with that of the capacitance potentiometer. The reactance varying means may comprise variable capacitance means and inductance means connected in parallel between one end of the coupling winding and the tap or an end of the secondary winding. The other end of the coupling winding is also connected to one end of the secondary winding.

Other objects and advantages of the invention will become apparent from the drawing, specification, and claims which follow, and the scope of the invention is pointed out in the claims.

Figure 1:
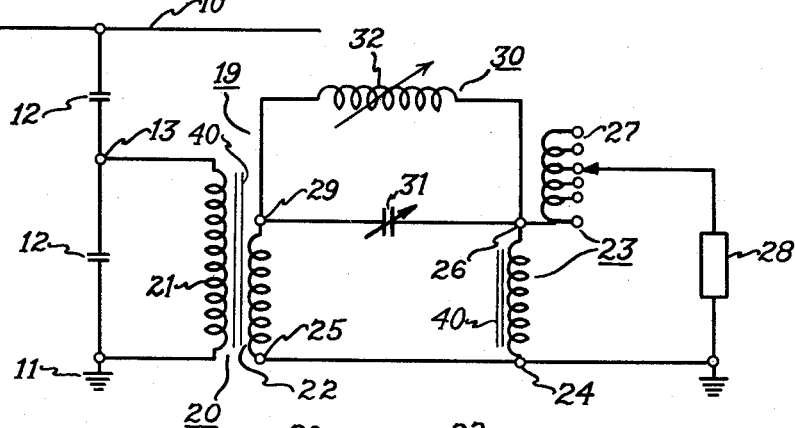
FIGURE 1 is a circuit diagram of our potential device employing a transformer connected between a capacitance potentiometer and a load.

The invention will now be explained by reference to the drawing. In FIGURE 1 a conductor 10 is shown to be connected to ground reference potential at 11 through several serially connected capacitors 12. The conductor 10 may be one phase of a polyphase alternating current high-voltage transmission system. The serially connected capacitors 12 may be a high-voltage condenser bushing having a capacitance tap at 13. A potential device 19 employs a step-down transformer 20 having a primary winding 21 connected to the capacitance tap 13 at one end and to the ground reference potential 11 at its other end. The output side of the transformer 20 has a coupling winding 22 that is closely coupled to the primary winding 21. The winding 22 has a predetermined number of turns between its opposite ends 25 and 29. The end 29 of the winding is at a potential in phase with and at the same polarity as the potential at the end of the primary winding 21 that is connected to the capacitance tap 13. In other words, the end 29 of the coupling winding 22 is at a lower potential than, but is otherwise electrically equivalent to, the input end of the primary winding 21. The transformer 20 has a loosely coupled secondary winding 23 that is connected at one end 24 to the other end 25 of the coupling winding 22. The secondary winding 23 is provided with a tap 26 that provides the same number of turns as the coupling winding 22. A portion 27 of the secondary winding 23 may be provided with a plurality of taps for varying the output of the potential device. A small load 28 having one side at ground reference potential may be connected across the output side of the secondary winding 23 in the manner shown in FIGURE 1.

The transformer 20 is provided with means 30 for adjusting the reactance of the potential device 19 to match the capacitive reactance of the voltage source. The reactance adjusting means 30 may comprise variable capacitance means 31 and variable inductance means 32 connected in parallel. The means 31 and 32 are connected between the end 29 of the coupling winding 22 and the tap 26 or an end of the winding 23 that provides the same number of turns as the winding 22. Thus the reactance adjusting means 30 connects the windings 22 and 23 in a closed loop circuit in which the voltage of the closely coupled winding and that of the loosely coupled winding are in opposition. The values of the capacitance means 31 and reactance means 32 may be selected so that the net impedance of the two is inductive. This circuit arrangement enables the inductive input reactance of the potential device 19 to be lowered by decreasing the value of the reactance means 32.

Connection of the means 30 between the end 29 of the winding 22 and the tap 26 is equivalent to connecting the means 30 in parallel with the transformer 19 between the tap 13 and the tap 26. The reasons are that the input reactance between the primary winding 21 and closely coupled winding 22 is negligible with respect to the reactance between the primary winding 21 and the loosely coupled winding 23, and that the end 29 of the coupling winding 22 is electrically equivalent to the end of the primary winding 21 that is connected to the tap 13.

In our improved potential device, low voltage elements may be employed for the capacitance means 31 and reactance means 32 because the means 30 is connected on the low-voltage side of the transformer 19 between points, 26 and 29, which are at the same potential when the secondary winding 23 is open-circuited. Thus when the load 28 is connected across the winding 23, the voltage drop across the means 31 and 32 will be that caused by their combined reactance and a very small fraction of the load current that flows through them. In other words, the circuit arrangement is such that the coupling winding 22 does not function to produce load current, and the load current essentially flows only through the secondary winding 23.

Figure 2:
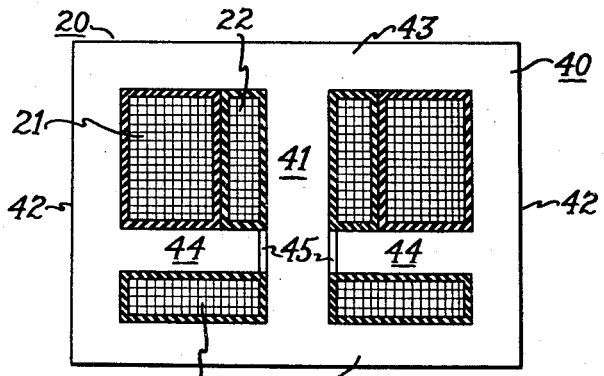
FIGURE 2 is a schematic cross-sectional view of the transformer of FIGURE 1 showing the relative positions of the windings.

FIGURE 2 illustrates a preferred way of arranging the windings on a core. The core 40 is the shell type having a center winding leg 41 and two outer legs 42, all of which are connected by yokes 43 in the conventional manner. Magnetic shunts 44 with air gaps at 45 are provided. The primary winding 21 and closely coupled coupling winding 22 are mounted concentrically on the center leg 41 on one side of the shunts 44. The loosely coupled secondary winding 23 is mounted on the leg 41 on the opposite side of the shunts 44. The variable capacitance means 31 and reactance means 32 are structurally independent of the transformer 20 and should be connected thereto in the manner previously described.

Figure 3:
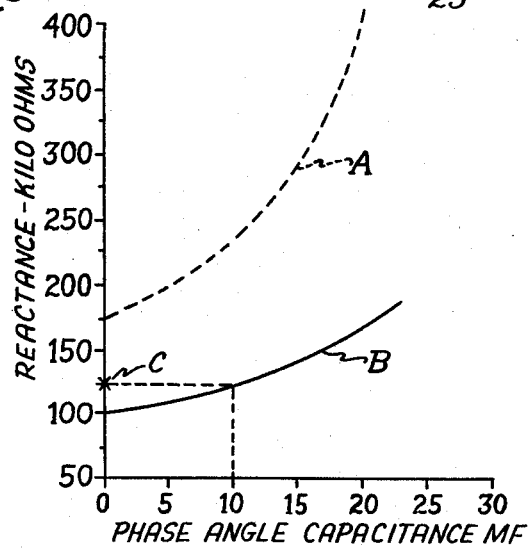
FIGURE 3 is a graph illustrating the manner in which our invention operates to reduce the reactance of a potential device.

Referring now to FIGURE 3, the curves therein show how our invention operates to reduce the inductive reactance of a commercial embodiment of a class A potential device as specified in AIEE Standard #31; the device was designed to furnish potentials of either 115 volts or 66.4 volts. The dotted curve A represents the reactance of the potential device when the variable reactance means 32 was omitted. The lowest point on the curve A is approximately 175 kilo-ohms; this represents the reactance of the potential device with the variable capacitance means 31 set at zero. Assuming that the potential device were to be connected to a bushing having a capacitive reactance of approximately 125 kilo-ohms, as indicated by the point C, the reactance of the potential device would be too high to achieve a resonant match. The curve B represents the reactance curve of the potential device after an inductance means 32 of predetermined value has been connected in the manner perviously described so that the net reactance of the potential device is lowered to about 100 kilo-ohms; this represents the inductive reactance of the potential device when the variable capacitance means 31 is set at zero. In such a situation to achieve the desired resonant match with the 125 kilo-ohm bushing the capacitance means 31 should be increased until it reaches a value of approximately 10 micro-farads; this will cause the net input reactance of the potential device to be raised to approximately 125 kilo-ohms, as shown by curve B. The inductance means 32 is variable so a wide range of starting points for the potential device reactance curve may be obtained. It will be appreciated by those skilled in the art that by decreasing the value of the inductance means 32, the starting point on the reactance curve for the potential device could be lowered further and a resonant match could be obtained with bushings having even lower capacitive reactance.

It will be understood, of course, that while the forms of the invention herein shown and described constitute preferred embodiments of this invention, it is not intended herein to illustrate all of the equivalent forms or ramifications thereof. For example, those skilled in the art will realize that when it is necessary to increase the reactance of a potential device, capacitance means should be substituted in place of the reactance means 32. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What we claim as new and desire to secure by Letters Patent of the United States is:

1. A potential device adapted to be connected between a capacitance potentiometer and a load comprising, a primary winding, a coupling winding closely coupled to said primary winding, said coupling winding having a predetermined number of turns, a secondary winding loosely coupled to said primary winding, a tap on said secondary winding providing substantially the same number of turns as said coupling winding, means for adjusting the reactance of said potential device to match the capacitance of said potentiometer comprising variable reactance means connected between one end of said coupling winding and said tap, and the other end of said coupling winding being electrically connected to one end of said secondary winding.

2. A potential device adapted to be connected between a capacitance potentiometer and a load comprising, a primary winding, a coupling winding closely coupled to said primary winding, said coupling winding having a predetermined number of turns, a secondary winding loosely coupled to said primary winding, a tap on said secondary winding providing substantially the same number of turns as said coupling winding, means for adjusting the reactance of said potential device to match the capacitance of said potentiometer comprising variable capacitance means and inductance means connected in parallel between one end of said coupling winding and the tap on said secondary winding, and the other end of said coupling winding being electrically connected to one end of said secondary winding.

3. A potential device adapted to be connected between a capacitance potentiometer and a load comprising, a primary winding, a coupling winding closely coupled to said primary winding, a secondary winding loosely coupled to said primary winding, means for adjusting the reactance of said potential device to match the capacitance of said potentiometer comprising variable capacitance means connected in parallel with inductance means, and the reactance adjusting means connecting said coupling winding to said secondary winding in a closed loop circuit in which the voltage of said coupling winding and that of secondary winding are in opposition.

4. A transformer for a potential device of the type employed between a capacitance potentiometer and a load, said transformer comprising a core, a primary winding surrounding a coaxial coupling winding on the same leg of said core so that said coupling winding is closely coupled to said primary winding, said primary winding adapted to have one end connected to a tap on a capacitance potentiometer, said coupling winding having a predetermined number of turns, said coupling winding having one end electrically equivalent to the end of said primary winding connected to the potentiometer tap, a secondary winding on said core leg, said secondary winding being separated from the other windings by a magnetic shunt so that said secondary winding is loosely coupled to said primary winding, a tap on said secondary winding providing substantially the same number of turns as said coupling winding, means for adjusting the reactance of said transformer to match the capacitance of said potentiometer comprising variable capacitance means and variable inductance means connected in parallel between said one end of said coupling winding and said tap on said secondary winding, and the other end of said coupling winding being directly connected to one end of said secondary winding.

5. In combination; an alternating-current high voltage source; a capacitance potentiometer connected between said source and ground, a voltage tap on said potentiometer; a potential device circuit comprising a transformer having a primary winding connected at one end to said voltage tap and to ground at the other end, a coupling winding closely coupled to said primary winding, said coupling winding having a predetermined number of turns, a secondary winding loosely coupled to said primary winding, said secondary winding being connected to a load, a tap on said secondary winding providing substantially the same number of turns as said coupling winding, and means for adjusting the reactance of said potential device to match the capacitance of said potentiometer comprising variable reactance means connected between one end of said coupling winding and said tap on said secondary winding, the other end of said coupling winding being directly connected to an end of said secondary winding, and said one end of said coupling winding and said one end of said primary winding being at potentials that are in phase and of the same polarity.

6. In combination; an alternating-current high voltage source; a capacitance potentiometer connected between said source and ground, a voltage tap on said potentiometer; a potential device circuit comprising a transformer having a primary winding connected at one end to said voltage tap and to ground at the other end, a coupling winding closely coupled to said primary winding, said coupling winding having a predetermined number of turns, a secondary winding loosely coupled to said primary winding, said secondary winding being connected to a load, a tap on said secondary winding providing substantially the same number of turns as said coupling winding, means for adjusting the reactance of said potential device to match the capacitance of said potentiometer comprising variable capacitance means and variable inductance means connected in parallel between one end of said coupling winding and said tap on said secondary winding, the other end of said coupling winding being directly connected to an end of said secondary winding, and said one end of said coupling winding and said one end of said primary winding being at potentials that are in phase and of the same polarity.

References Cited in the file of this patent
UNITED STATES PATENTS

| | | |
|---|---|---|
| 2,276,032 | Gibbs | Mar. 10, 1942 |
| 2,310,097 | Langguth | Feb. 2, 1943 |
| 2,313,950 | Langguth | Mar. 16, 1943 |
| 2,440,540 | Farr | Apr. 27, 1948 |
| 2,510,631 | Harder | June 6, 1952 |
| 2,930,964 | Goodman | Mar. 29, 1960 |